(12) United States Patent
Tsai

(10) Patent No.: US 7,930,802 B2
(45) Date of Patent: Apr. 26, 2011

(54) CASTOR THAT IS BRAKED SOLIDLY AND STABLY WITHOUT PRODUCING VIBRATION

(76) Inventor: Po-Chuan Tsai, Tainan Hsien (TW)

( * ) Notice: Subject to any disclaimer, the term of this patent is extended or adjusted under 35 U.S.C. 154(b) by 350 days.

(21) Appl. No.: 12/168,271

(22) Filed: Jul. 7, 2008

(65) Prior Publication Data

US 2010/0000050 A1    Jan. 7, 2010

(51) Int. Cl.
*B60B 33/00* (2006.01)
(52) U.S. Cl. ....................................... 16/35 R
(58) Field of Classification Search .................. 16/35 R, 16/35 D, 37, 38; 188/1.12, 30, 31; 248/346.11
See application file for complete search history.

(56) References Cited

U.S. PATENT DOCUMENTS

| 5,988,323 | A  | * | 11/1999 | Chu  | 188/1.12 |
| 6,360,851 | B1 | * | 3/2002  | Yang | 188/1.12 |
| 6,532,624 | B1 | * | 3/2003  | Yang | 16/35 R  |
| 6,810,560 | B1 | * | 11/2004 | Tsai | 16/35 R  |
| 7,707,686 | B2 | * | 5/2010  | Chou | 16/35 R  |
| 2009/0113671 | A1 | * | 5/2009 | Chu  | 16/35 R |
| 2010/0000050 | A1 | * | 1/2010 | Tsai | 16/35 D |
| 2010/0170061 | A1 | * | 7/2010 | Lin  | 16/47   |

FOREIGN PATENT DOCUMENTS

| JP | 61033302 A | * | 2/1986 |
| JP | 02283501 A | * | 11/1990 |
| JP | 05310004 A | * | 11/1993 |
| TW | 528016 | | 4/2003 |

* cited by examiner

*Primary Examiner* — Chuck Y. Mah
(74) *Attorney, Agent, or Firm* — Alan Kamrath; Kamrath & Associates PA

(57) ABSTRACT

A castor includes an upright support post, a brake ring secured on the support post, a castor body rotatably mounted on the support post, two rollers rotatably mounted on the castor body, a first locking member movably mounted on the castor body, a second locking member movably mounted on the castor body, and a brake handle pivotally mounted on the castor body. Thus, when the castor is locked, each of the two rollers is locked onto and cannot be rotated relative to the castor body, and the castor body is locked onto and cannot be rotated relative to the support post, so that the castor will stop rotating when being braked so as to provide a double-braking effect.

16 Claims, 7 Drawing Sheets

CASTOR THAT IS BRAKED SOLIDLY AND STABLY WITHOUT PRODUCING VIBRATION

BACKGROUND OF THE INVENTION

1. Field of the Invention

The present invention relates to a castor and, more particularly, to a castor having a double-braking function so that the castor will stop rotating when being braked.

2. Description of the Related Art

A conventional castor 2 in accordance with the prior art shown in FIG. 6 was disclosed in the Taiwanese Patent Publication No. 528016. In the conventional castor 2, a drive member 23 is pressed downward to pivot a pivot portion 231 which has a press portion 232 which pushes a chamfered portion 241 of a slide 24 and compress an elastic member 27 so that a fixing pin 25 is movable in an elongate slot 201 of a castor body 20 to extend into one of a locking grooves 211 of each of two rollers 21 so as to lock and brake the rollers 21. At the same time, a locking block 26 is pushed by a second elastic member 28 to extend into a positioning recess 222 of an annular protrusion 221 of an upright support post 22 so that the castor body 20 is locked on and cannot be rotated relative to the support post 22. Thus, the castor 2 will stop rotating when being braked so as to provide a double-braking effect.

Another conventional castor 3 in accordance with the prior art shown in FIG. 7 was disclosed in the Taiwanese Patent Publication No. 255795. In the conventional castor 3, a drive member 30 is pressed downward and is pivoted about a castor body 32 to move its push end 301 which pushes a push block 31 to move downward in a receiving recess 32 of the castor body 32. At this time, the push face 311 of the push block 31 pushes a ramp 331 of a slide 33 so that the slide 33 compresses a spring 34, and a fixing pin 332 on an end portion of the slide 33 is moved and locked in one of a locking grooves 41 of each of two rollers 4 so as to lock and brake the rollers 4. At the same time, a ball 36 located at the bottom of a receiving hole 35 of the castor body 32 is pressed by a protrusion 333 of the slide 33 to move upward to compress a second spring 37 in the receiving hole 35, so that an enlarged flange 381 of a stop rod 38 is pushed upward by the second spring 37 to compress a third spring 37a. Thus, the stop rod 38 is pushed upward and is locked in a positioning hole 392 of a fixing block 391 of an upright support post 39 so that the castor body 32 is locked on and cannot be rotated relative to the support post 39. Thus, the castor 3 will stop rotating when being braked so as to provide a double-braking effect.

BRIEF SUMMARY OF THE INVENTION

In accordance with the present invention, there is provided a castor, comprising an upright support post, a brake ring secured on a lower end of the support post and having an outer wall provided with a toothed locking portion, a castor body rotatably mounted on the support post and located between the support post and the brake ring, two rollers rotatably mounted on two opposite sides of the castor body and each having an inside provided with a toothed locking section, a first locking member movably mounted on the castor body and having a first end provided with two opposite locking flanges each having a toothed engaging portion facing the toothed locking section of a respective one of the two rollers, a second locking member movably mounted on the castor body and having a first end provided with a toothed engaging section facing the toothed locking portion of the brake ring, and a brake handle pivotally mounted on the castor body and connected with the first locking member and the second locking member to drive the toothed engaging portion of each of the two locking flanges of the first locking member to engage the toothed locking section of the respective roller and to drive the toothed engaging section of the second locking member to engage the toothed locking portion of the brake ring.

The primary objective of the present invention is to provide a castor that is braked solidly and stably without producing vibration.

Another objective of the present invention is to provide a castor, wherein the castor is braked and stops rotating simultaneously by pressing the press portion of the brake handle downward and is unlocked by pulling the press portion of the brake handle upward, thereby facilitating a user locking and unlocking the castor.

A further objective of the present invention is to provide a castor, wherein the second guide face of the pivot base abuts the guide portion of the castor body so that the brake handle is operated exactly and stably without producing vibration during operation, thereby enhancing the braking effect of the castor.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
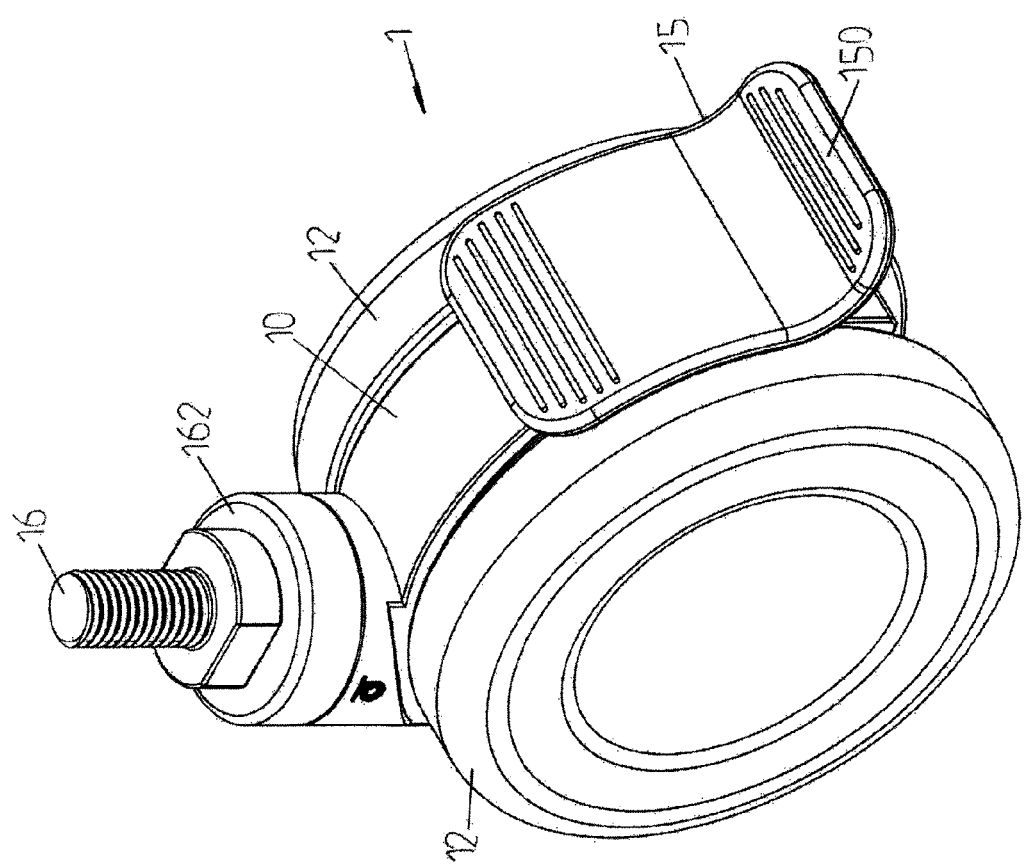
FIG. 1 is a perspective view of a castor in accordance with the preferred embodiment of the present invention.

Referring to the drawings and initially to FIGS. 1-4, a castor 1 in accordance with the preferred embodiment of the present invention comprises an upright support post 16, a brake ring 17 secured on a lower end of the support post 16 and having an outer wall provided with a toothed locking portion 171, a castor body 10 rotatably mounted on the support post 16 and located between the support post 16 and the brake ring 17, two rollers 12 rotatably mounted on two opposite sides of the castor body 10 by a mandrel 11 and each having an inside provided with a toothed locking section 120, a first locking member 13 movably mounted on the castor body 10 and having a first end provided with two opposite locking flanges 131 each having a toothed engaging portion 132 facing the toothed locking section 120 of a respective one of the two rollers 12, a second locking member 14 movably mounted on the castor body 10 and having a first end provided with a toothed engaging section 140 facing the toothed locking portion 171 of the brake ring 17, and a brake handle 15 pivotally mounted on the castor body 10 and connected with the first locking member 13 and the second locking member 14 to drive the toothed engaging portion 132 of each of the two locking flanges 131 of the first locking member 13 to engage the toothed locking section 120 of the respective roller 12 and to drive the toothed engaging section 140 of the second locking member 14 to engage the toothed locking portion 171 of the brake ring 17.

The lower end of the support post 16 is provided with a hexagonal mounting stud 160. The mounting stud 160 of the support post 16 has a peripheral wall provided with an annular retaining groove 161. A cap 162 is mounted on a top of the castor body 10 and rotatably mounted on the support post 16.

The brake ring 17 has an inner wall provided with a hexagonal fixing hole 170 secured on the mounting stud 160 of the support post 16, and a substantially C-shaped snap ring 18 is secured in the retaining groove 161 of the mounting stud 160 and abutting a bottom of the brake ring 17 to limit the brake ring 17 on the support post 16.

The castor body 10 has a central portion provided with a shaft hole 101 to allow passage of the mandrel 11. The castor body 10 has a periphery provided with an upright mounting hole 105 rotatably mounted on the support post 16. The castor body 10 has an end provided with a receiving hole 102 to receive the first locking member 13 and a receiving chamber 104 to receive the second locking member 14. The castor body 10 has a face provided with an arcuate guide portion 106 located between the receiving hole 102 and the receiving chamber 104. The castor body 10 has a bottom provided with a receiving recess 107 connected to the receiving chamber 104 to receive the brake ring 17. The castor body 10 is provided with a pin hole 103 located between the receiving hole 102 and the receiving chamber 104.

The brake handle 15 has a first side provided with a pivot base 151 pivotally mounted on the castor body 10 and a second side provided with a press portion 150 to drive the pivot base 151 to pivot relative to the castor body 10. The pivot base 151 of the brake handle 15 has a substantially U-shaped cross-sectional profile and has a first end provided with two opposite first drive portions 152 each abutting a second end of the first locking member 13 to drive and move the first locking member 13 relative to the two rollers 12 and a second end provided with a second drive portion 153 abutting a second end of the second locking member 14 to drive and move the second locking member 14 relative to the brake ring 17. The pivot base 151 of the brake handle 15 has a mediate portion provided with a pivot hole 156 located between the first drive portions 152 and the second drive portion 153, and a pivot pin 19 extends through the pivot hole 156 of the pivot base 151 and the pin hole 103 of the castor body 10 so that the pivot base 151 of the brake handle 15 is pivotally mounted on the castor body 10.

The pivot base 151 of the brake handle 15 is provided with an arcuate first guide face 155 that is movable to abut the guide portion 106 of the castor body 10 when the toothed engaging portion 132 of each of the two locking flanges 131 of the first locking member 13 is disengaged from the toothed locking section 120 of the respective roller 12 and when the toothed engaging section 140 of the second locking member 14 is disengaged from the toothed locking portion 171 of the brake ring 17, so that each of the two rollers 12 is rotatable relative to the castor body 10, and the castor body 10 is rotatable relative to the support post 16. The pivot base 151 of the brake handle 15 is further provided with an arcuate second guide face 154 that is movable to abut the guide portion 106 of the castor body 10 when the toothed engaging portion 132 of each of the two locking flanges 131 of the first locking member 13 engages the toothed locking section 120 of the respective roller 12 and when the toothed engaging section 140 of the second locking member 14 engages the toothed locking portion 171 of the brake ring 17, so that each of the two rollers 12 is locked onto the castor body 10, and the castor body 10 is locked onto the support post 16. The second guide face 154 of the pivot base 151 is located between the second drive portion 153 and the first guide face 155, and the first guide face 155 of the pivot base 151 is located between the second guide face 154 and the first drive portions 152.

The two locking flanges 131 of the first locking member 13 protrudes outwardly from two opposite sides of the receiving hole 102 of the castor body 10. The second end of the first locking member 13 is provided with two opposite limit grooves 130 to receive and limit the first drive portions 152 of the brake handle 15 respectively so that the first drive portions 152 of the brake handle 15 are movable and rotatable in the two limit grooves 130 of the first locking member 13 respectively. The second end of the second locking member 14 is provided with a limit recess 141 to receive and limit the second drive portion 153 of the brake handle 15 so that the second drive portion 153 of the brake handle 15 is movable and rotatable in the limit recess 141 of the second locking member 14.

Figure 2:
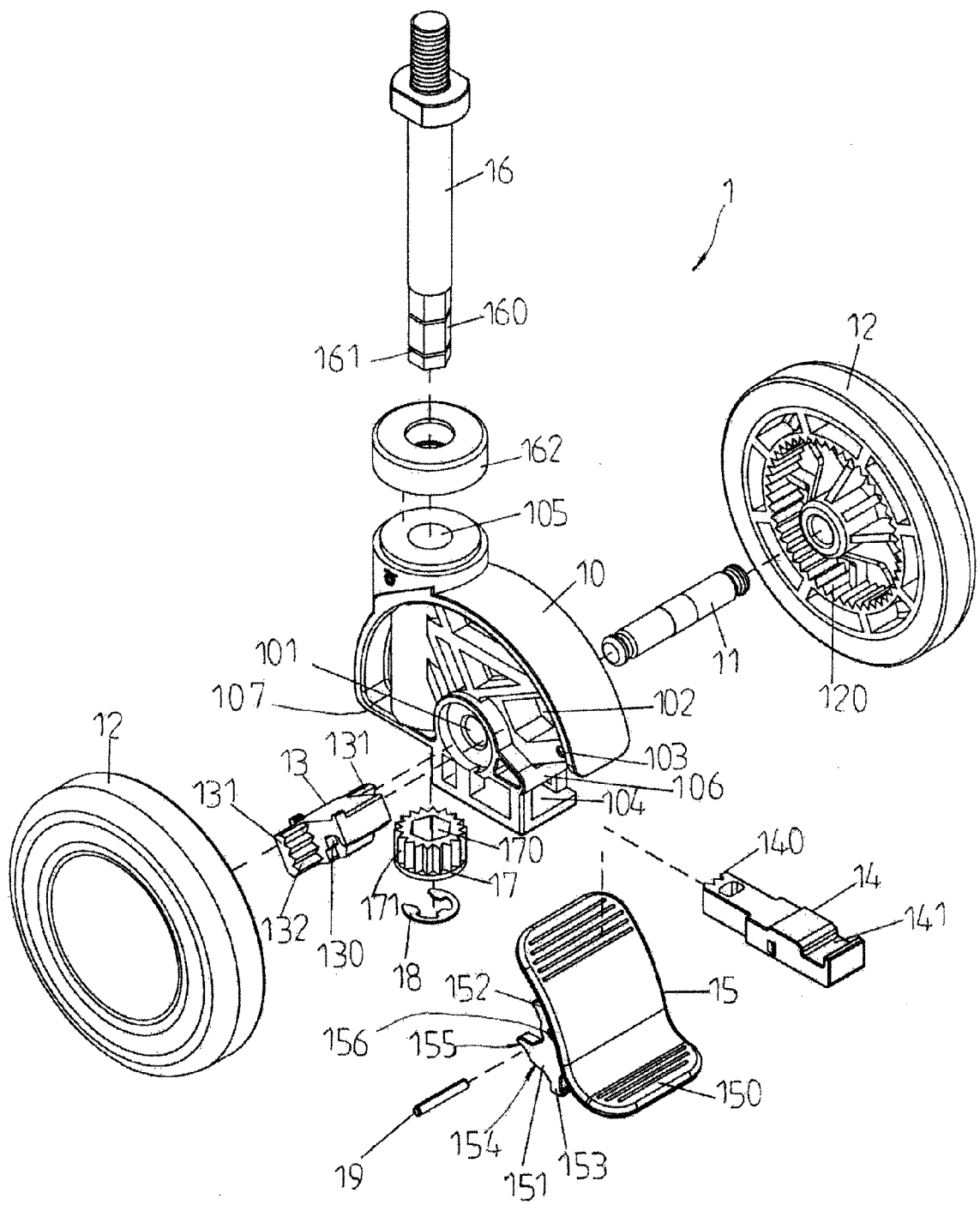
FIG. 2 is an exploded perspective view of the castor as shown in FIG. 1.
Figure 3:
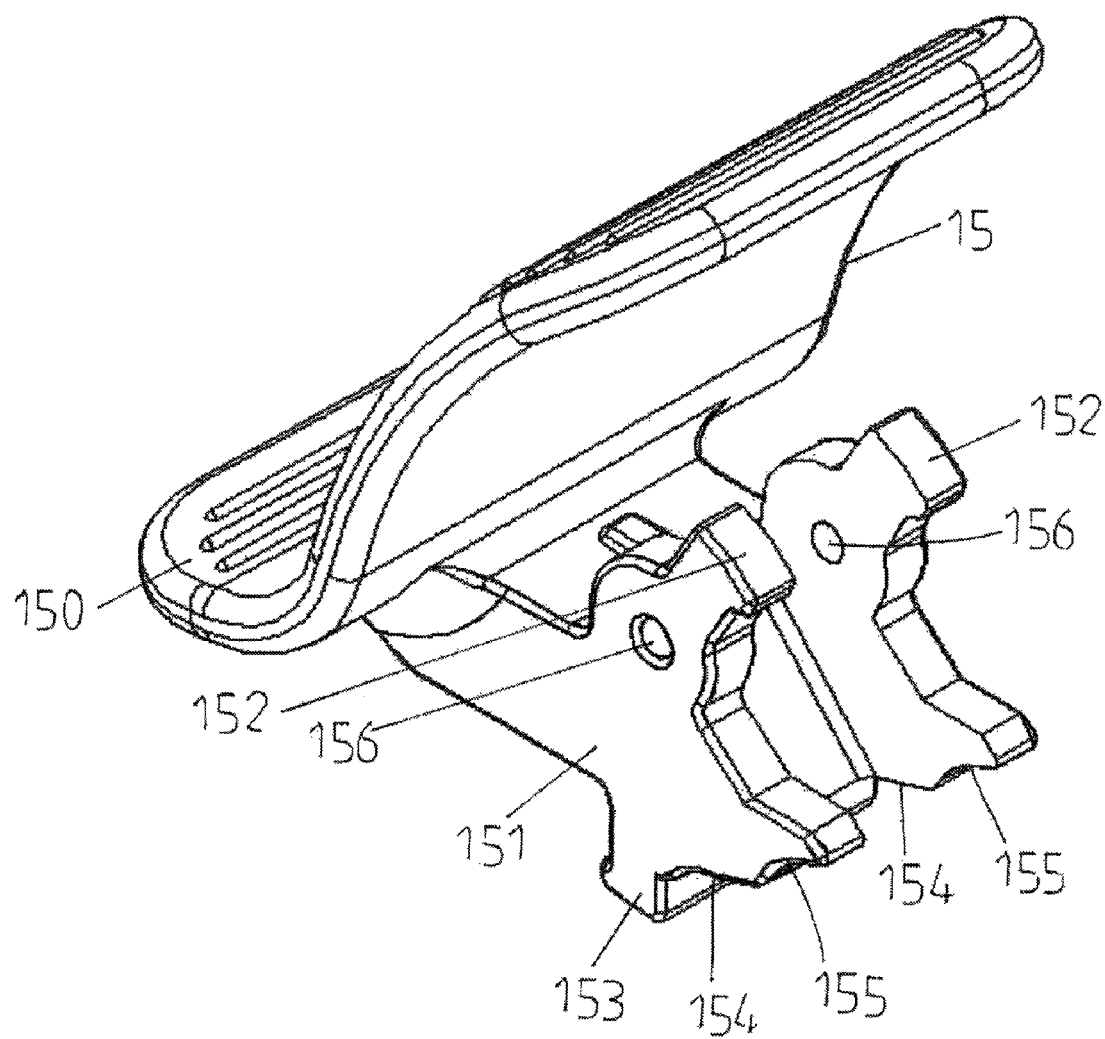
FIG. 3 is a perspective view of a brake handle of the castor as shown in FIG. 2.
Figure 4:
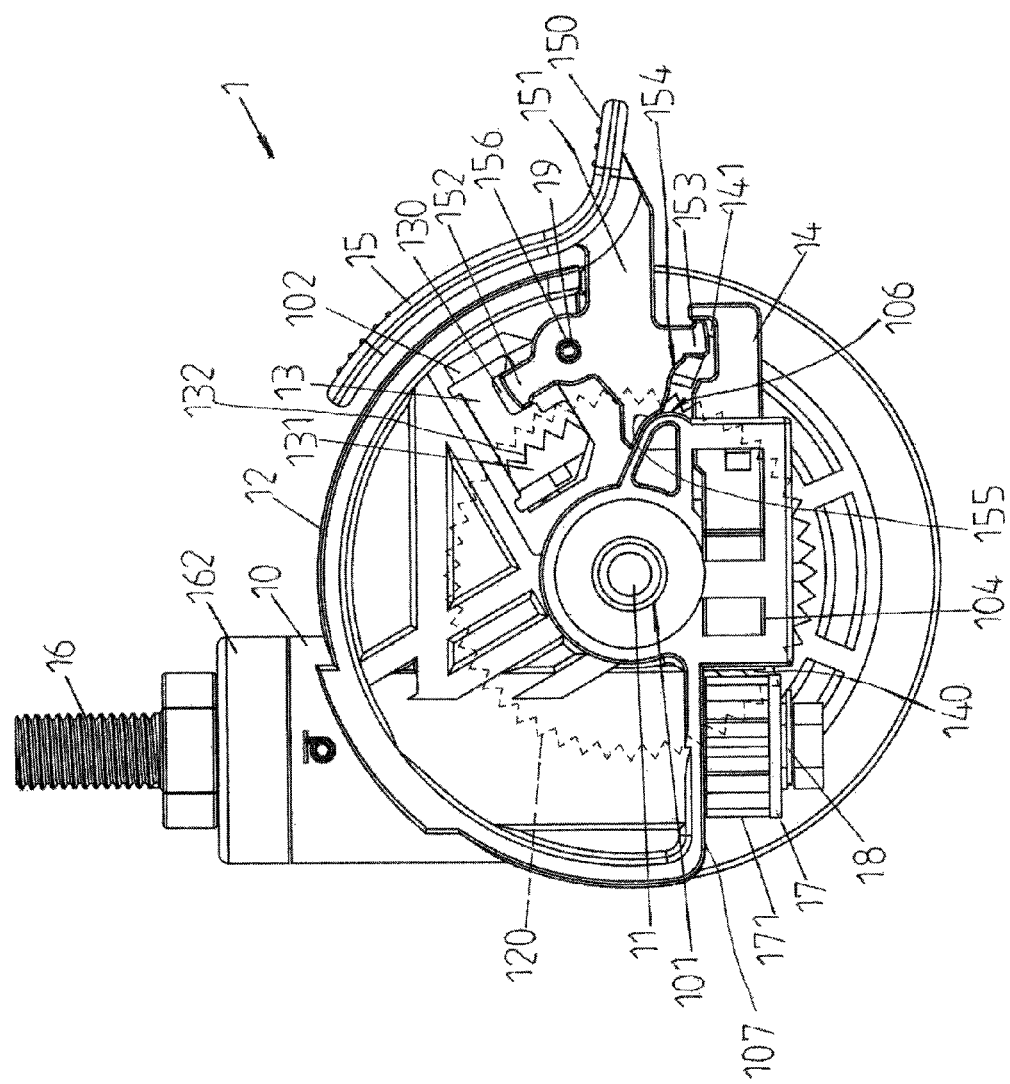
FIG. 4 is a side cross-sectional view of the castor as shown in FIG. 1.
Figure 5:
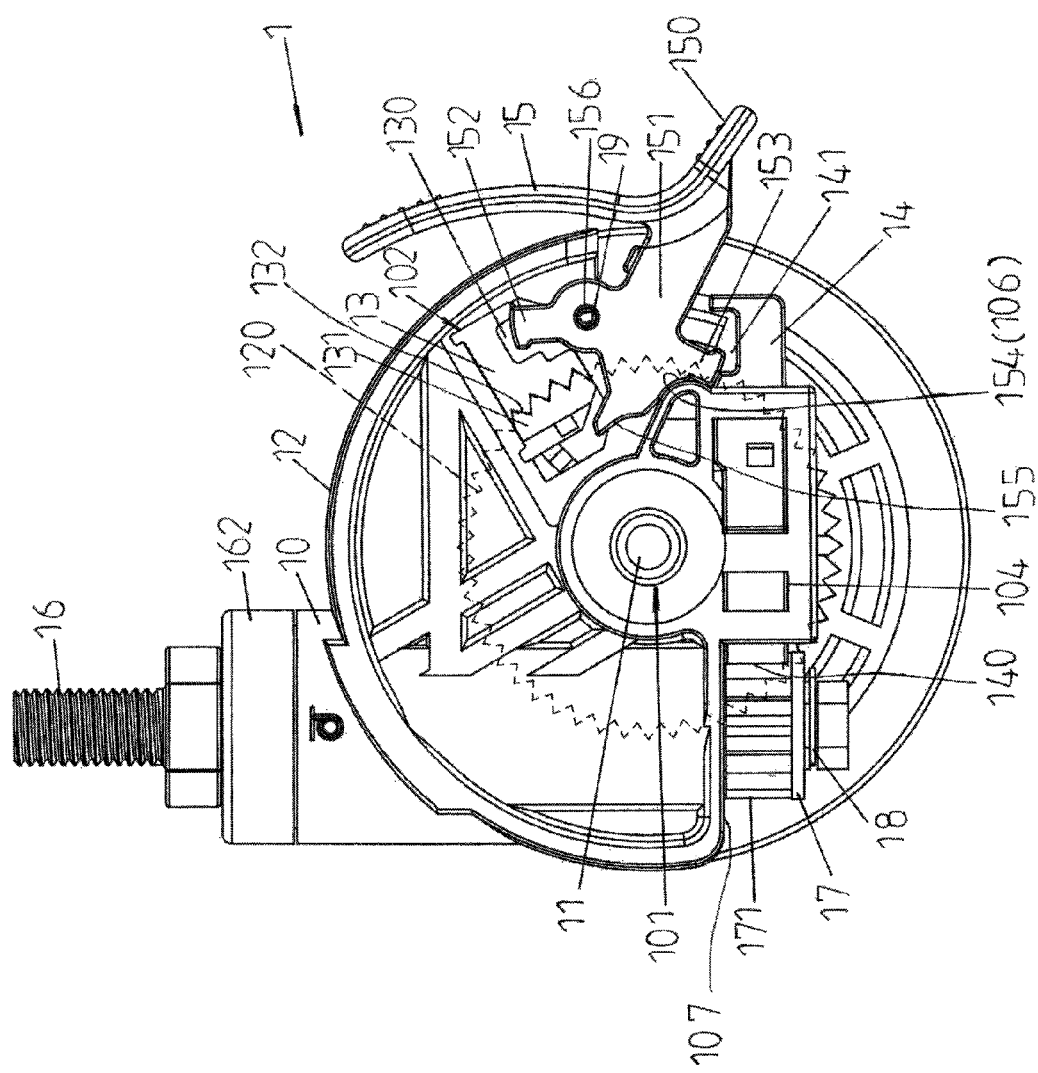
FIG. 5 is a schematic operational view of the castor as shown in FIG. 4.
Figure 6:
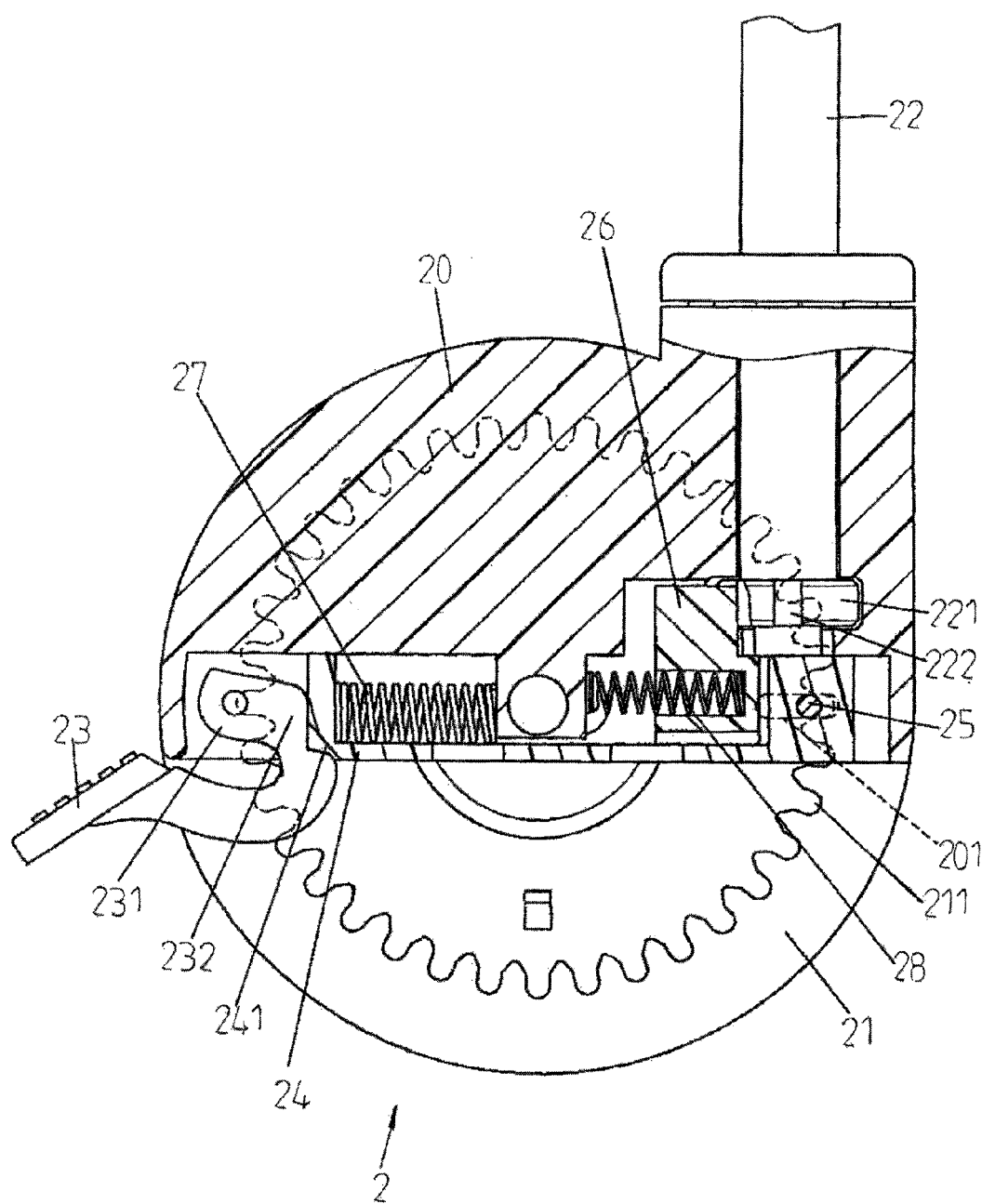
FIG. 6 is a side cross-sectional view of a conventional castor in accordance with the prior art.
Figure 7:
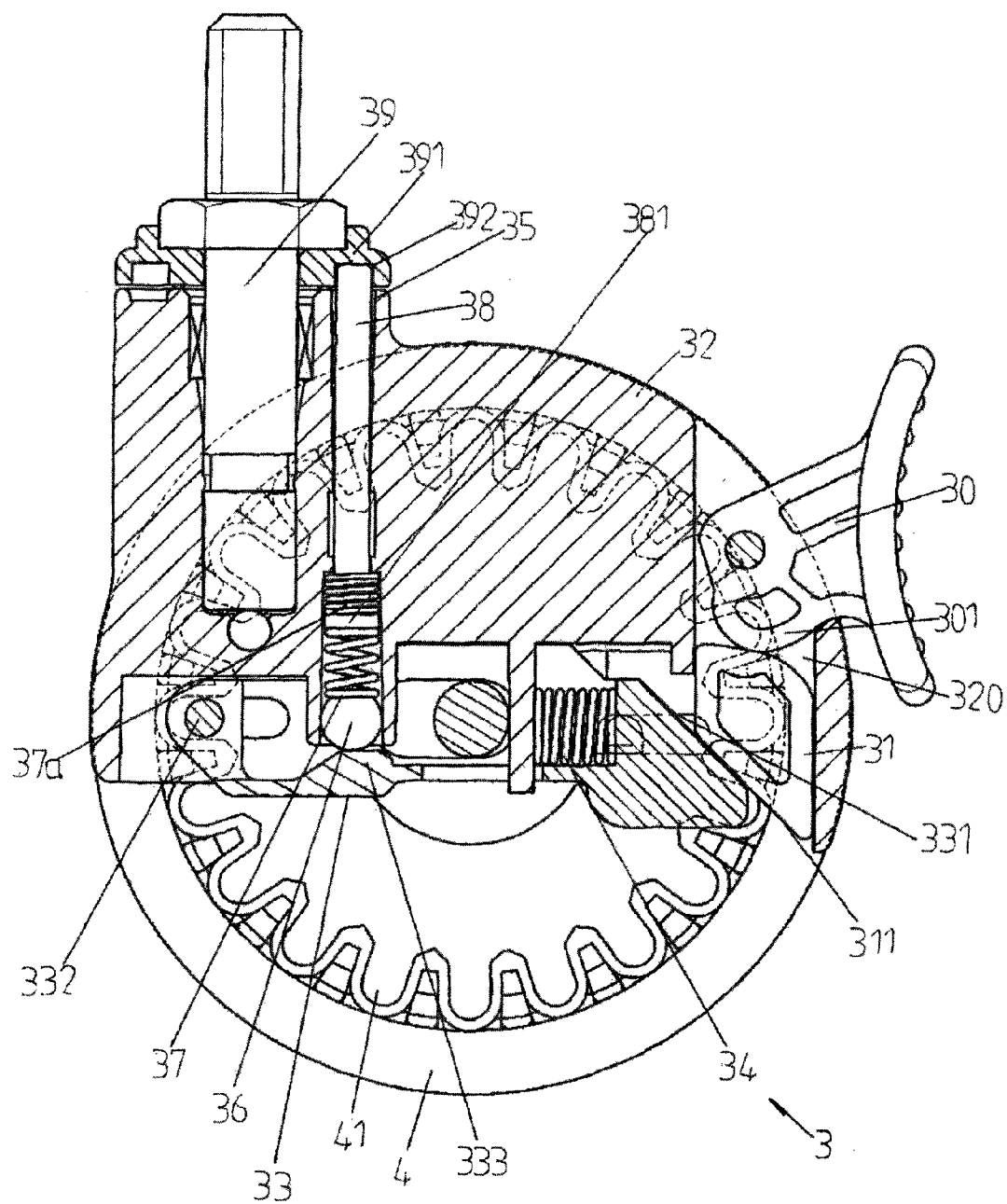
FIG. 7 is a side cross-sectional view of another conventional castor in accordance with the prior art.

In operation, referring to FIGS. 4 and 5 with reference to FIGS. 1-3, when the first guide face 155 of the pivot base 151 is movable to abut the guide portion 106 of the castor body 10 as shown in FIG. 4, the toothed engaging portion 132 of each of the two locking flanges 131 of the first locking member 13 is disengaged from the toothed locking section 120 of the respective roller 12, when the toothed engaging section 140 of the second locking member 14 is disengaged from the toothed locking portion 171 of the brake ring 17, so that each of the two rollers 12 is rotatable relative to the castor body 10, and the castor body 10 is rotatable relative to the support post 16.

When a user wishes to lock the castor 1, the press portion 150 of the brake handle 15 is pressed downward to drive the pivot base 151 of the brake handle 15 to pivot about the pivot pin 19 relative to the castor body 10 until the second guide face 154 of the pivot base 151 is movable to abut the guide portion 106 of the castor body 10. In such a manner, when the second guide face 154 of the pivot base 151 is movable to abut the guide portion 106 of the castor body 10 as shown in FIG. 5, the toothed engaging portion 132 of each of the two locking flanges 131 of the first locking member 13 is movable to engage the toothed locking section 120 of the respective roller 12, and the toothed engaging section 140 of the second locking member 14 movable to engage the toothed locking portion 171 of the brake ring 17, so that each of the two rollers 12 is locked onto the castor body 10, and the castor body 10 is locked onto the support post 16, thereby locking the castor 1.

Accordingly, when the castor 1 is locked, each of the two rollers 12 is locked onto and cannot be rotated relative to the castor body 10, and the castor body 10 is locked onto and cannot be rotated relative to the support post 16, so that the castor 1 will stop rotating when being braked so as to provide a double-braking effect. In addition, the castor 1 is braked and stops rotating simultaneously by pressing the press portion 150 of the brake handle 15 downward and is unlocked by pulling the press portion 150 of the brake handle 15 upward, thereby facilitating a user locking and unlocking the castor 1. Further, the second guide face 154 of the pivot base 151 abuts the guide portion 106 of the castor body 10 so that the brake handle 15 is operated exactly and stably without producing vibration during operation, thereby enhancing the braking effect of the castor 1.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:
1. A castor, comprising:
an upright support post;
a brake ring secured on a lower end of the support post and having an outer wall provided with a toothed locking portion;

a castor body rotatably mounted on the support post and located between the support post and the brake ring;

two rollers rotatably mounted on two opposite sides of the castor body and each having an inside provided with a toothed locking section;

a first locking member movably mounted on the castor body and having a first end provided with two opposite locking flanges each having a toothed engaging portion facing the toothed locking section of a respective one of the two rollers;

a second locking member movably mounted on the castor body and having a first end provided with a toothed engaging section facing the toothed locking portion of the brake ring;

a brake handle pivotally mounted on the castor body and connected with the first locking member and the second locking member to drive the toothed engaging portion of each of the two locking flanges of the first locking member to engage the toothed locking section of the respective roller and to drive the toothed engaging section of the second locking member to engage the toothed locking portion of the brake ring;

wherein the brake handle has a first side provided with a pivot base pivotally mounted on the castor body and a second side provided with a press portion to drive the pivot base to pivot relative to the castor body;

the pivot base of the brake handle has a first end provided with two opposite first drive portions each abutting a second end of the first locking member to drive and move the first locking member relative to the two rollers and a second end provided with a second drive portion abutting a second end of the second locking member to drive and move the second locking member relative to the brake ring.

2. The castor in accordance with claim 1, wherein
the second end of the first locking member is provided with two opposite limit grooves to receive and limit the first drive portions of the brake handle respectively;
the first drive portions of the brake handle are movable and rotatable in the two limit grooves of the first locking member respectively.

3. The castor in accordance with claim 1, wherein
the second end of the second locking member is provided with a limit recess to receive and limit the second drive portion of the brake handle;
the second drive portion of the brake handle is movable and rotatable in the limit recess of the second locking member.

4. The castor in accordance with claim 1, wherein the castor body has an end provided with a receiving hole to receive the first locking member and a receiving chamber to receive the second locking member.

5. The castor in accordance with claim 4, wherein
the castor body has a face provided with an arcuate guide portion;
the pivot base of the brake handle is provided with an arcuate first guide face that is movable to abut the guide portion of the castor body when the toothed engaging portion of each of the two locking flanges of the first locking member is disengaged from the toothed locking section of the respective roller and when the toothed engaging section of the second locking member is disengaged from the toothed locking portion of the brake ring, so that each of the two rollers is rotatable relative to the castor body, and the castor body is rotatable relative to the support post;

the pivot base of the brake handle is further provided with an arcuate second guide face that is movable to abut the guide portion of the castor body when the toothed engaging portion of each of the two locking flanges of the first locking member engages the toothed locking section of the respective roller and when the toothed engaging section of the second locking member engages the toothed locking portion of the brake ring, so that each of the two rollers is locked onto the castor body, and the castor body is locked onto the support post.

6. The castor in accordance with claim 5, wherein the guide portion of the castor body is located between the receiving hole and the receiving chamber.

7. The castor in accordance with claim 5, wherein
the second guide face of the pivot base is located between the second drive portion and the first guide face;
the first guide face of the pivot base is located between the second guide face and the first drive portions.

8. The castor in accordance with claim 4, wherein
the castor body is provided with a pin hole;
the pivot base of the brake handle has a mediate portion provided with a pivot hole;
the castor further comprising a pivot pin extending through the pivot hole of the pivot base and the pin hole of the castor body so that the pivot base of the brake handle is pivotally mounted on the castor body.

9. The castor in accordance with claim 8, wherein the pin hole of the castor body is located between the receiving hole and the receiving chamber.

10. The castor in accordance with claim 8, wherein the pivot hole of the pivot base is located between the first drive portions and the second drive portion.

11. The castor in accordance with claim 4, wherein the two locking flanges of the first locking member protrudes outwardly from two opposite sides of the receiving hole of the castor body.

12. The castor in accordance with claim 4, wherein the castor body has a bottom provided with a receiving recess connected to the receiving chamber to receive the brake ring.

13. The castor in accordance with claim 1, wherein the pivot base of the brake handle has a substantially U-shaped cross-sectional profile.

14. The castor in accordance with claim 1, wherein
the two rollers are rotatably mounted on the two opposite sides of the castor body by a mandrel;
the castor body has a central portion provided with a shaft hole to allow passage of the mandrel.

15. The castor in accordance with claim 1, wherein
the lower end of the support post is provided with a hexagonal mounting stud;
the mounting stud of the support post has a peripheral wall provided with an annular retaining groove;
the brake ring has an inner wall provided with a hexagonal fixing hole secured on the mounting stud of the support post;
the castor further comprising a substantially C-shaped snap ring secured in the retaining groove of the mounting stud and abutting a bottom of the brake ring to limit the brake ring on the support post.

16. The castor in accordance with claim 1, wherein the castor body has a periphery provided with an upright mounting hole rotatably mounted on the support post.

* * * * *